ized Patent

(12) United States Patent
Masias et al.

(10) Patent No.: US 11,629,788 B2
(45) Date of Patent: Apr. 18, 2023

(54) ADJUSTABLE CAGE ASSEMBLY FOR FLOW CONTROL DEVICES

(71) Applicant: Emerson Process Management Regulator Technologies, Inc., McKinney, TX (US)

(72) Inventors: Justin Masias, Tom Bean, TX (US); David Scheffert, Marshalltown, IA (US)

(73) Assignee: Emerson Process Management Regulator Technologies, Inc., McKinney, TX (US)

( * ) Notice: Subject to any disclaimer, the term of this patent is extended or adjusted under 35 U.S.C. 154(b) by 0 days.

(21) Appl. No.: 17/410,805

(22) Filed: Aug. 24, 2021

(65) Prior Publication Data

US 2023/0065973 A1 Mar. 2, 2023

(51) Int. Cl.
*F16K 3/32* (2006.01)
*F16K 3/26* (2006.01)
*F16K 47/08* (2006.01)

(52) U.S. Cl.
CPC . *F16K 3/32* (2013.01); *F16K 3/26* (2013.01)

(58) Field of Classification Search
CPC . F16K 3/32; F16K 3/246; F16K 3/267; F16K 3/36; F16K 47/08–47/16
See application file for complete search history.

(56) References Cited

U.S. PATENT DOCUMENTS

| 10,830,358 | B2 | 11/2020 | Hoistetter et al. |
| 11,035,479 | B2 | 6/2021 | Masias et al. |
| 2007/0272316 | A1 | 11/2007 | Zecchi et al. |
| 2008/0258097 | A1 | 10/2008 | Griffin et al. |
| 2017/0184219 | A1* | 6/2017 | Braeuer .............. F16K 3/32 |
| 2019/0120388 | A1* | 4/2019 | Kloss ................ F16K 3/267 |
| 2020/0325996 | A1* | 10/2020 | Hostetter ............ F16K 1/52 |

OTHER PUBLICATIONS

Brochure for Noise-Attenuation Technologies for Control Valves, Emerson Automation Solutions Flow Controls, May 2018, 16 pages.
Product brochure for High Pressure Transmission and Distribution Pressure Control, EZH and EZHSO Series Pressure Reducing Regulators, Emerson Automation Solutions, Oct. 2017, 2 pages.
Instruction Manual for Types EZH and EZHSO Pressure Reducing Regulators, Emerson Automation Solutions, May 2019, 40 pages.

* cited by examiner

*Primary Examiner* — Marina A Tietjen
(74) *Attorney, Agent, or Firm* — Quarles & Brady LLP

(57) ABSTRACT

An adjustable cage assembly for a flow control device can include a first cage body and a second cage body. The first cage body can be rotationally fixed relative to the second cage body at a plurality of alignments to provide a flow opening of variable size for adjustable control of fluid flow areas through the adjustable cage assembly.

19 Claims, 8 Drawing Sheets

ADJUSTABLE CAGE ASSEMBLY FOR FLOW CONTROL DEVICES

BACKGROUND

Flow control devices can be used in a variety of industrial, commercial, and other settings including to regulate flowrate or pressure of a fluid flowing from a fluid source. In some applications, it may be useful to increase or decrease the flowrate or pressure of a fluid flowing from the pressure source toward a downstream application or device.

SUMMARY

Some embodiments of the invention provide a restriction cage configured to adjust flow through a flow control device.

Some embodiments of the invention provide an adjustable cage assembly for a flow control device. The adjustable cage can include a first cage body and a second cage body. Each of the first and second cage bodies include a first wall segment having an interior surface and an exterior surface, a first locking feature formed on the interior surface of the first wall segment, a second wall segment having an interior surface and an exterior surface, and a second locking feature formed on the exterior surface of the second wall segment. The first wall segment and the second wall segment can be spaced in a circumferential direction to form a first opening therebetween. The first locking feature of the first cage body can be configured to engage the second locking feature of the second cage body to rotationally secure the first cage body relative to the second cage body at one of a plurality of alignments, to at least partially align the first opening of the first cage body at one of a plurality alignments to at least partially align the first opening of the first cage body with the first opening of the second cage body to form a corresponding plurality of opening profiles for flow across the first and second cage bodies.

In some embodiments, an adjustable cage assembly can include first and second locking features. The first or second locking features can include an array of locking members.

In some embodiments, an adjustable cage assembly can include a locking member of an array of locking members configured as a rib that extends axially relative to a corresponding first or second cage body.

In some embodiments, an adjustable cage assembly can include an array of locking members. The array of locking members can include a plurality of ribs and a plurality of grooves between the plurality of ribs. One of the plurality of grooves or the plurality of ribs can correspond to a plurality of alignments.

In some embodiments, an adjustable cage assembly can include first and second cage bodies. The cage bodies can each include a continuous annular base. First and second wall segments can extend axially from the annular base.

In some embodiments, an adjustable cage assembly can include first and second cage bodies. The first and second cage bodies can include third and fourth wall segments extending axially from an annular base and opposite first and second wall segments, respectively.

In some embodiments, an adjustable cage assembly can include an interior surface of a first wall segment of a first cage body that faces an exterior surface of a second wall segment of a second cage body at each of a plurality of alignments.

In some embodiments, an adjustable cage assembly can include a first opening symmetric about an axis and configured to form a linearly variable flow opening.

In some embodiments, an adjustable cage assembly can include a cage body that defines a central axis. The cage body can also include a first wall segment that is radially farther from the central axis than a second wall segment.

In some embodiments, an adjustable cage assembly can include an opening profile. The opening profile corresponding to a first opening of a first cage body being fully radially aligned with a first opening of a second cage body provides a least-restrictive position for the adjustable cage assembly. The opening profile corresponding to the first wall segment of the first cage body extending circumferentially to the greatest extend across the first opening of the second cage body provides a most-restrictive position for the adjustable cage assembly. Additional opening profiles provide additional positions between the least-restrictive and most-restrictive positions.

In some embodiments, an adjustable cage assembly can include first and second cage bodies that are substantially identical to each other.

Some embodiments of the invention provide a restriction cage for a flow control device. The restriction cage can include a first annular member and a second annular member. The second annular member can be configured to be rotationally fixed relative to the first annular member at a plurality of alignments to provide a flow opening of a corresponding plurality of sizes, to provide adjustable control of fluid flowrates through the restriction cage.

In some embodiments, a restriction cage can include a first annular member having a first circumferential wall and a first cutout formed in the first circumferential wall.

In some embodiments, a restriction cage can include a second annular member having a second circumferential wall configured to axially overlap a first circumferential wall. Rotating the second annular member relative to a first annular member can adjust an amount of overlap between the first circumferential wall and the second circumferential wall.

In some embodiments, a restriction cage can include a second annular member having a second circumferential wall and a second cutout formed in the second circumferential wall. An alignment of a first cutout with the second cutout can define a current size of a flow opening.

In some embodiments, a restriction cage can include a first annular member. The first annular member can include an array of first locking members and a second annular member can include a second locking member. The second locking member can be configured to engage the array of first locking members to secure the first and second annular members at a plurality of alignments.

In some embodiments, a restriction cage can include a plurality of first locking members that are configured as one of a recess or a protrusion. Second locking members can be configured as the other of the recess or the protrusion.

In some embodiments, a restriction cage can include a first annular member that is substantially identical to a second annular member.

Some embodiments of the invention provide a method of adjusting an effective flow area in a flow control device. The method can include rotating a first cage body having a first opening relative to a second cage body having a second opening to align the first opening with the second opening at any selected one of a plurality of alignments to define an effective flow area, rotationally securing the first cage body relative to the second cage body in the selected one of the plurality of alignments, and installing the first cage body and the second cage body in the flow control device at a flow control opening.

In some embodiments, a method of adjusting an effective flow area in a flow control device can include, from a reference orientation, rotating a first cage body relative to a second cage body in a first direction to increase the effective flow area and rotating the first cage body relative to the second cage body in a direction opposite the first direction to decrease the effective flow area.

In some embodiments, a method of adjusting an effective flow area in a flow control device can include, for a degree of rotation within a first rotational range, rotating a first cage body relative to a second cage body to linearly increase or decrease the effective flow area relative to the degree of rotation.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
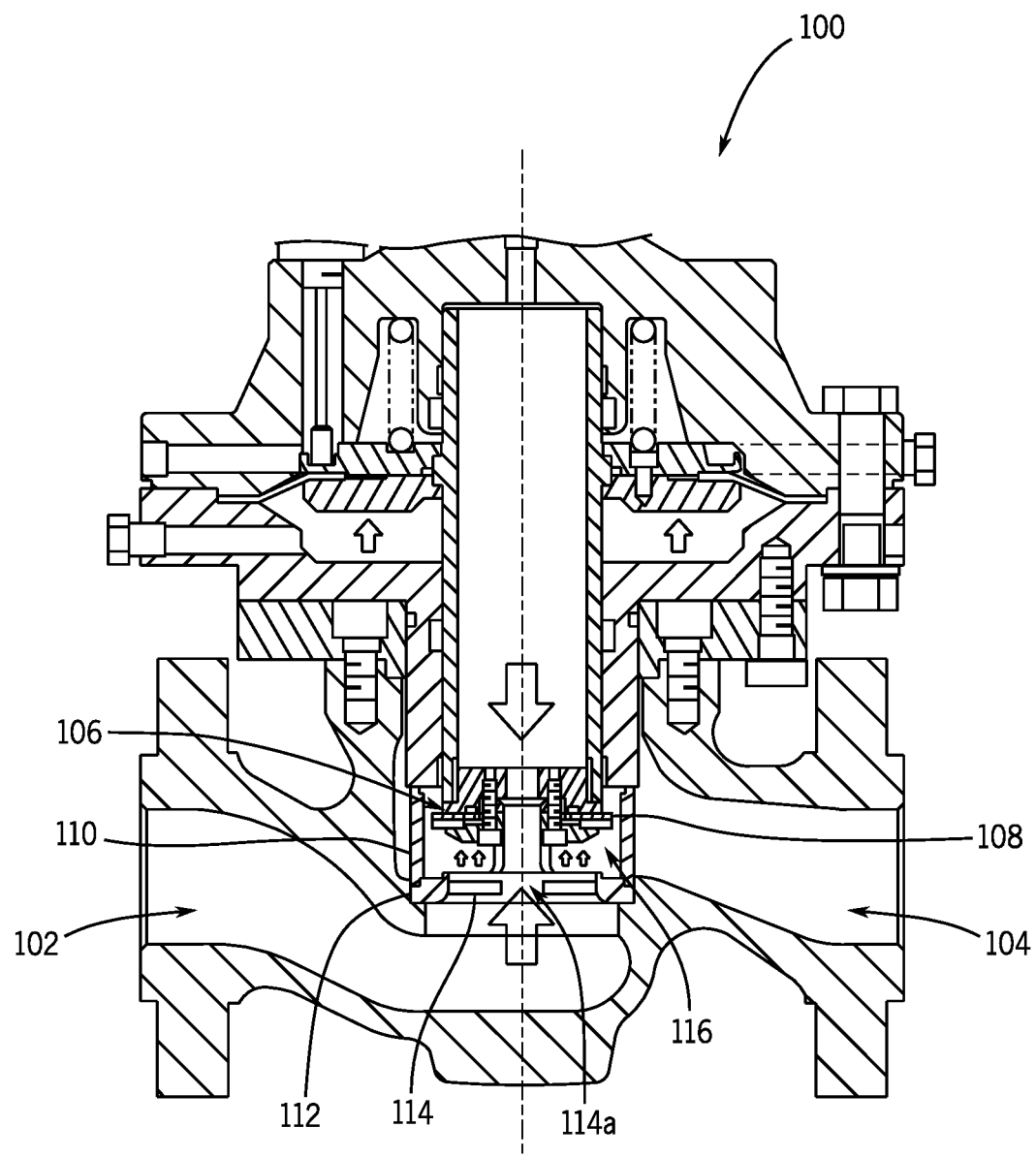
FIG. 1 is a cross-sectional partial view of a flow control device including a restriction cage.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the invention are explained in detail, it is to be understood that the invention is not limited in its application to the details of construction and the arrangement of components set forth in the following description or illustrated in the attached drawings. The invention is capable of other embodiments and of being practiced or of being carried out in various ways. Also, it is to be understood that the phraseology and terminology used herein is for the purpose of description and should not be regarded as limiting. For example, the use of "including," "comprising," or "having" and variations thereof herein is meant to encompass the items listed thereafter and equivalents thereof as well as additional items.

As briefly discussed above, flow control devices can be used to decrease flowrate or pressure of a fluid flowing from a fluid source toward a downstream application. Certain systems and vessels require protection to avoid over-pressurization. Flow control devices, such as regulators and relief valves, for example, can be used in such systems to reduce or relieve excess fluid pressure. In general, a flow control device can include an inlet, an outlet, and a flow control assembly. The flow control assembly can include a primary control member, such as a disc or other plug, for example, and a secondary control member to further restrict flow through the flow control device.

In some flow control devices, including regulators, a curtain area can be formed between a valve seat and a primary control member. In general, the curtain area is a flow window created by an open valve at a maximum lift and is a function of an orifice circumference and the travel of the valve. In some cases, a secondary control member can be placed within the curtain area to further restrict flow through the regulator (or other device). The flow restriction provided by the secondary control member can help to reduce the flow through the regulator while avoiding damage to the seat (e.g., when certain secondary control members are installed in a regulator, the flow may not be damagingly directed into the seat at high pressure drops).

Embodiments of the invention can provide an adjustable secondary control member that can accommodate any of a range of desired flow restrictions through a flow control device without requiring the replacement of an entire flow control device, which can lead to a substantial increase in cost and system complexity. For example, some embodiments of the invention provide a restriction cage that can be adjusted to change a profile of one or more intermediate openings of the cage, so that a desired flowrate can be provided through the cage via the one or more intermediate openings. In general, in this regard, an adjustable cage assembly according to embodiments of the invention can include first and second cage bodies configured to be rotationally fixed to each other at a plurality of alignments to provide a flow opening of variable size for adjustable control of fluid flowrates through the cage assembly, and thereby through a flow control device. The adjustability can provide a relatively high resolution of variable flow rates (e.g., small adjustment intervals) for a flow control device without excessive or invasive modifications to the flow control device.

In some embodiments, a restriction cage can include substantially identical first and second cage bodies (i.e., cage bodies produced with the same manufacturing processes and equipment based on the same specifications and/or geometry) that can be assembled together into an adjustable assembly. Each cage body can, for example, include two pairs of legs. When the restriction cage is assembled, one pair of the legs can be disposed at an outer diameter of the cage, and the other pair of legs can be disposed at an inner diameter of the cage. Thus, for example, substantially identical cage bodies can be oriented oppositely each other and assembled to form a complete, adjustable assembly.

In some embodiments, outer-diameter legs or other features on a first cage body can include a locking member, such as a protruding lug or rib, for example, that is configured to interlock with a gap (e.g., recess) on the inner-diameter legs or other features on a second cage body. In some cases, such a gap can be included in a plurality of gaps (e.g., plurality of spaced recesses) corresponding to a plurality of adjustable positions of the adjustable cage. Likewise, in some embodiments, the outer-diameter legs can include one or more gaps, and the inner diameter legs can include a locking member, such as a protruding lug or rib, for example.

In some embodiments, an adjustable restriction cage can include rotationally securable first and second cage bodies. In some cases, when a first cage body is rotationally locked relative to a second cage body, the first cage body may still be movable (e.g., slidable) axially relative to the second cage body. In some embodiments, relative axial movement of the first and second cage bodies may be prevented via a coupling (e.g., mechanical or magnetic) between the first and second cage bodies. For example, the first and second cage bodies may be secured via a roll pin, set screw, retaining clip, etc. In some embodiments, the first and second cage bodies may be axially secured via tapered lugs or other tapered features so that an interference is formed between the first and second cage bodies when slid into an axial alignment. For example, a lock member may have a tapered end portion that permits one cage body to slide axially in one direction relative to the other cage body into a locking position. Once in the locking position, the one cage body may be prevented from moving in an opposing second direction to axially secure the cage bodies.

Further, in some embodiments, windows (e.g., openings) of an adjustable restriction cage can be configured to receive panels therein to provide additional flow restriction through the adjustable window cage. For example, a whisper panel (e.g., a mesh panel with an array of orifices) may be inserted into or radially aligned with one or more of the windows of the adjustable window cage to further restrict flow to a desired flow rate.

Referring now to FIG. 1, an example flow control device 100 is illustrated. The flow control device 100 is configured as a pressure reducing regulator. The flow control device 100 includes an inlet 102, an outlet 104, and a control assembly 106. The control assembly 106 includes a disk holder assembly 108 and a control member 110. In the illustrated embodiment, the control member 110 is configured as a secondary control member that surrounds the seat 112 of the flow control device 100 such that the control member 110 is positioned in the flow path between the inlet 102 and the outlet 104 immediately downstream of the seat 112. In general, the control member 110 can be configured as an adjustable restriction cage, according to embodiments of the invention. Particular examples of configurations for an adjustable restriction cage will be described below in detail, including with reference to FIGS. 2-8. Generally, however, a control member configured as an adjustable restriction cage can be manually adjusted (e.g., prior to installation) to provide a selected profile for one or more restriction openings (e.g., windows through the cage) for flow through the cage, and the flow control device 100 at large. In this way, for example, an installer or operator can customize the restriction behavior of the control member to the needs of a particular application.

In some embodiments, a control member according to the invention can provide generally improved performance for a flow control device (e.g., a regulator), particularly at low valve lift, as well as increased adaptability. For example, in some conventional designs, a restricted trim plate can be used to reduce flow or increase pressure drop through a flow control device, including as illustrated with the plate 114 in FIG. 1. Although a restriction orifice 114a of the plate 114 can provide for reduced flow and increased pressure drop, fluid dynamics downstream of the orifice 114a can result in an area of reduced pressure upstream of the curtain area 116 (e.g., as indicated by relative size of block arrows in FIG. 1, representing local pressures). Force imbalances caused by this reduced-pressure area can sometimes result in suboptimal performance of the device 100. However, in some embodiments, placement of the control member 110 as shown (e.g., as an adjustable restriction cage at or downstream of the curtain area 116) can allow the plate 114 to be removed before operation or omitted entirely.

While the control member 110 in FIG. 1, which is configured as an adjustable restriction cage, is installed in the flow control device 100 as shown (i.e., configured as a regulator), it should be appreciated that an adjustable restriction cage or other control members according to embodiments of the invention can be installed in other flow control devices, including in other regulators and in different types of valves, such as relief valves, for example.

Figure 2:
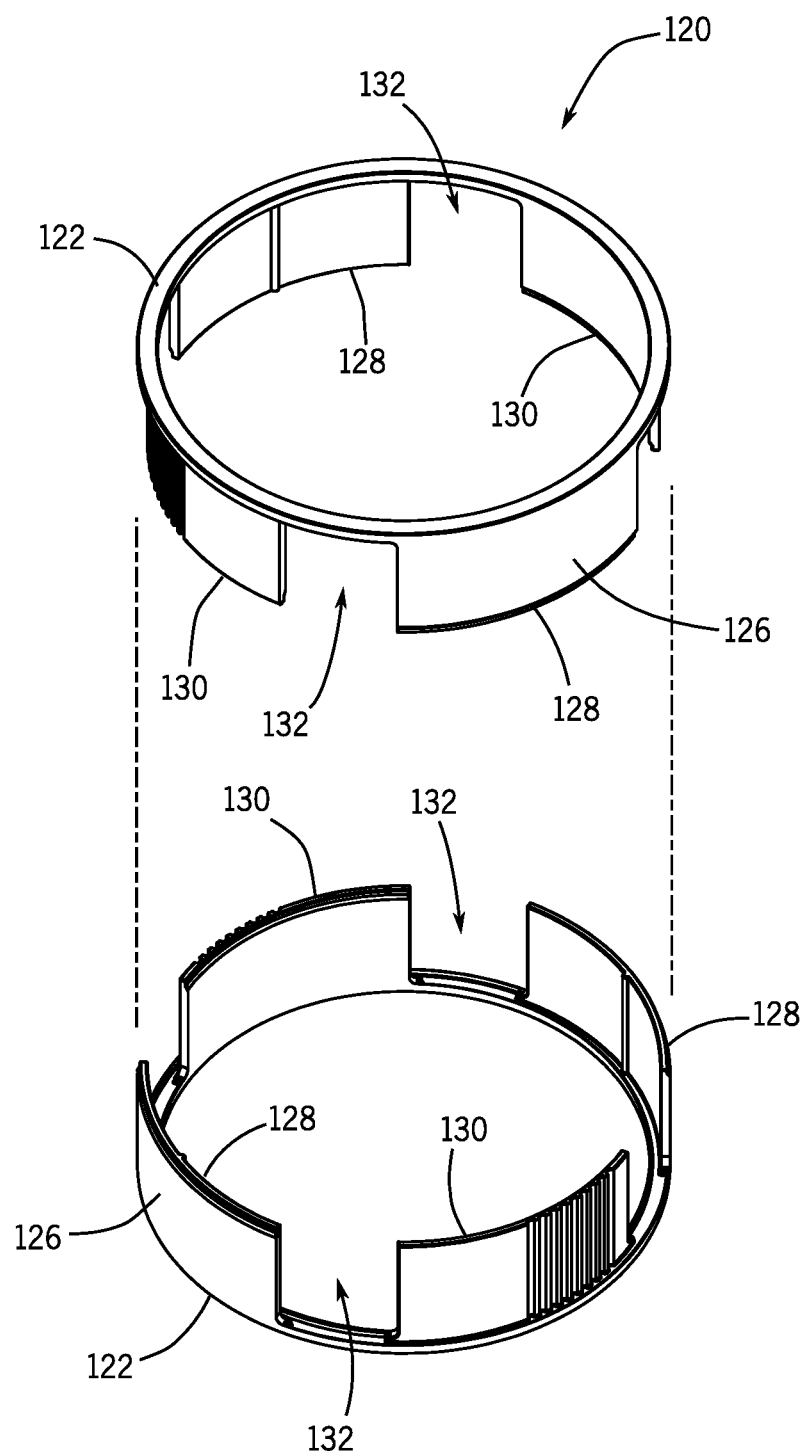
FIG. 2 is an exploded isometric view of an adjustable cage assembly according to an embodiment of the invention.

FIG. 2 illustrates a control member configured as a restriction cage 120 according to an embodiment of the invention. In general, the restriction cage 120 may be installed in a variety of flow control devices, including with a similar configuration as the control member 110 in the flow control device 100. In particular, the restriction cage 120 is configured as an adjustable cage assembly having first and second cage bodies 122. In the illustrated embodiment, the first and second cage bodies 122 are substantially identical to each other, as can facilitate simplified manufacturing and easy use. However, other configurations are also possible.

As shown in FIG. 2, each of the cage bodies 122 includes a circumferential wall 126. Further, as shown, each of the circumferential walls 126 includes a plurality of wall segments. In particular, in the illustrated example, the circumferential wall 126 includes two pairs of wall segments 128, 130, each circumferentially separated from adjacent wall segments 130, 128 by an opening 132. Further, all of the wall segments 128, 130 have the same circumferential length and axial height and are regularly spaced around the circumferential wall 126. In other embodiments, a circumferential wall of a first cage body can include more or fewer, or otherwise different wall segments and corresponding openings, compared to the restriction cage 120.

Figure 3:
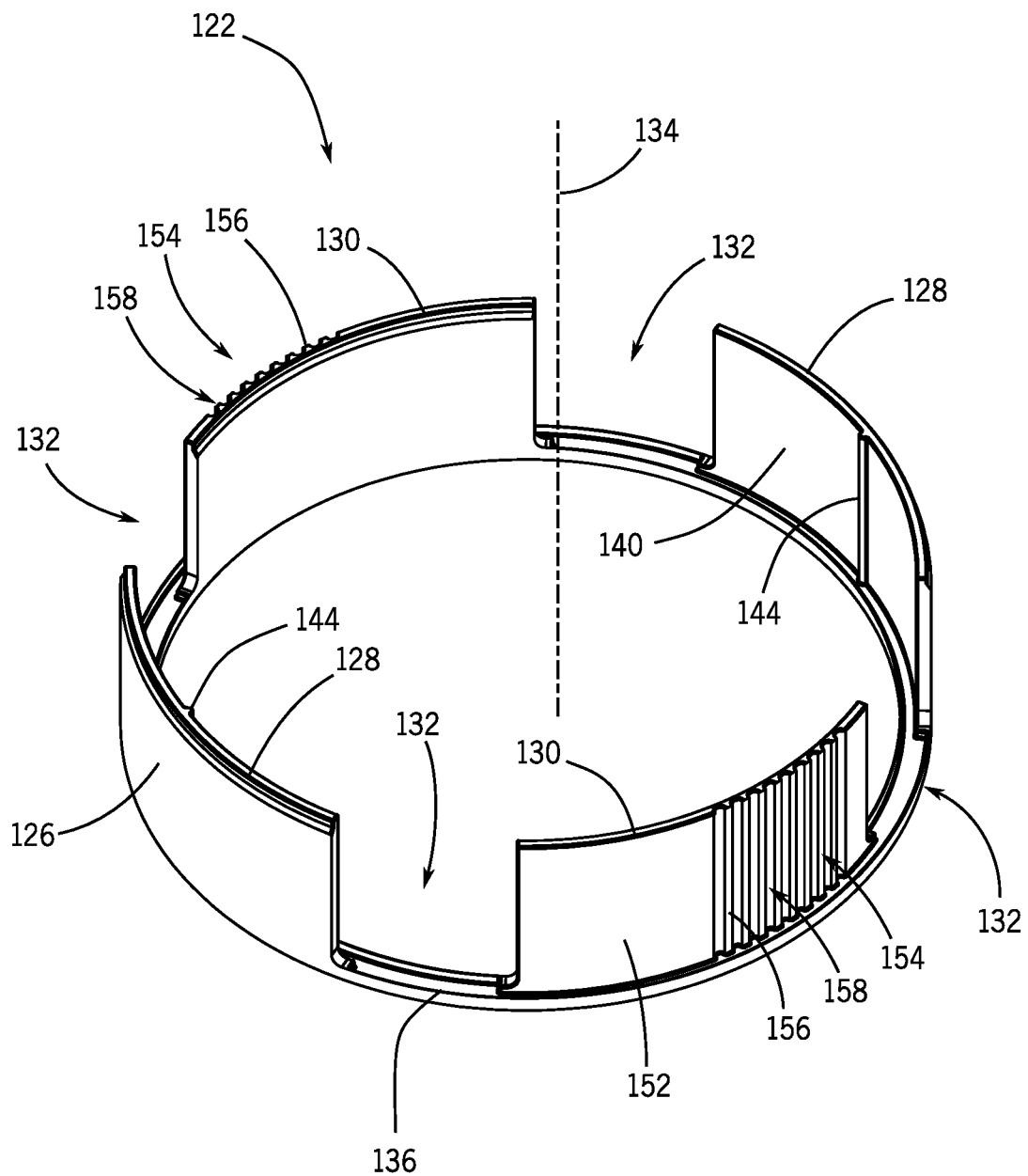
FIG. 3 is an isometric view of one cage body of the adjustable cage assembly of FIG. 2.
Figure 4:
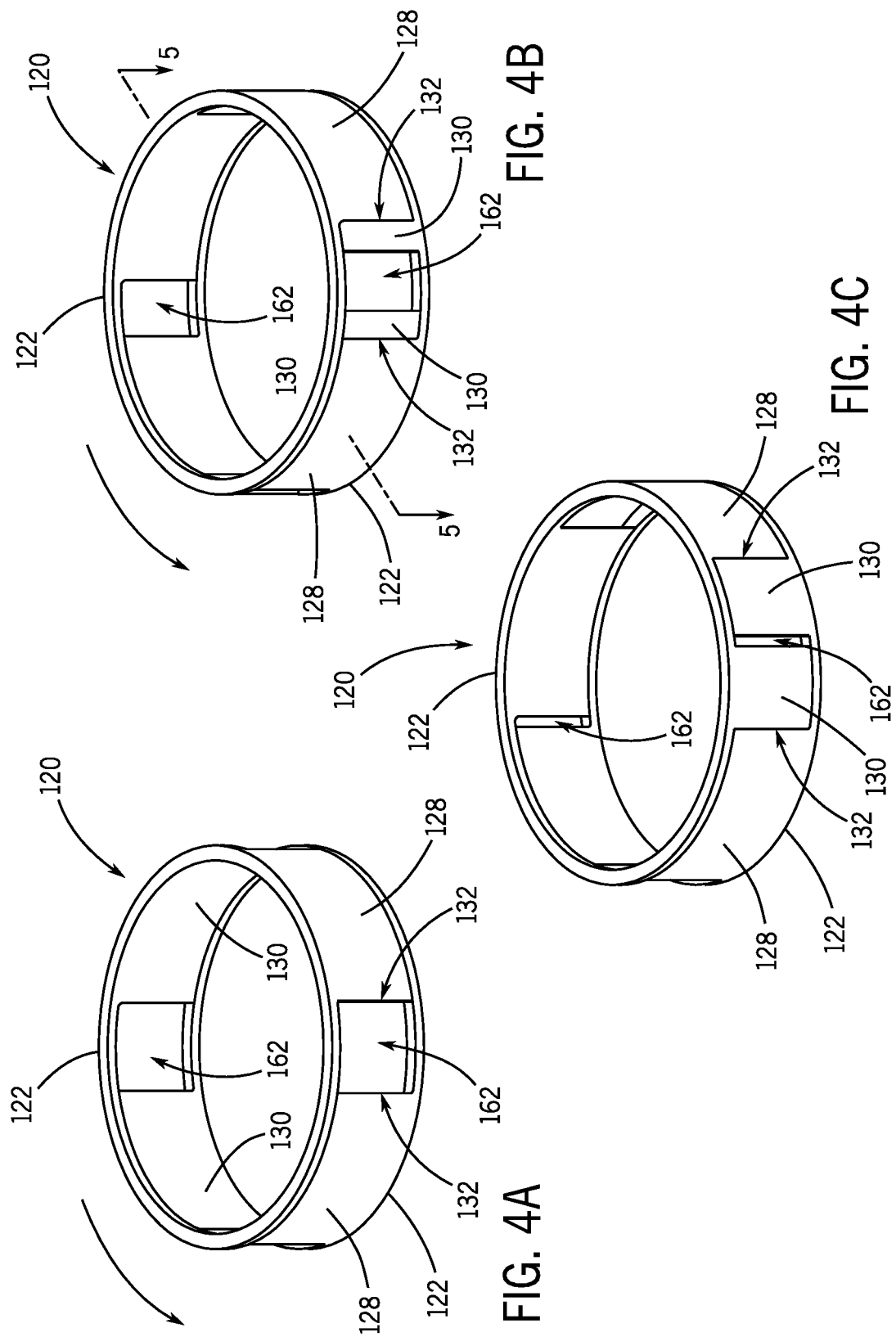
FIG. 4A is an isometric view of the adjustable cage assembly of FIG. 2 in a fully-open position.
FIG. 4B is an isometric view of the adjustable cage assembly of FIG. 2 in a partially-open position.
FIG. 4C is an isometric view of the adjustable cage assembly of FIG. 2 in partially-closed position.

With reference to FIG. 3, one of the cage bodies 122 is illustrated in isolation. As briefly described above, the cage body 122 includes a first pair of wall segments 128 and a second pair of wall segments 130. The wall segments 128, 130 are circumferentially spaced about a central axis 134 of the cage body 122. In general, the cage body 122 is configured as an annular member and includes a continuous annular base 136. Each of the wall segments 128, 130 extend axially from the annular base 136. In the illustrated embodiment, the wall segments 128, 130 are alternately spaced so that the first pair of wall segments 128 are opposite each other and the second pair of wall segments 130 are opposite each other. Further, the wall segments 128 are generally radially farther from the axis 134 than the wall segments 130, as will be further discussed below.

Each of the first wall segments 128 includes an interior surface 140 and an exterior surface opposite the interior surface 140. The interior surface 140 faces toward the central axis 134 and the exterior surface faces away from the central axis 134. Further, the interior surface 140 includes a first locking feature 144. In the illustrated embodiment, the first locking feature 144 is a locking member configured as a rib that extends axially along the first wall segment 128. In other embodiments, a first locking feature of a cage body can be configured as one or more other protrusions or as one or more recesses that extend fully or partially along a wall segment, or as a differently configured detent configured to engage a corresponding locking feature on another cage body to rotationally secure the two cage bodies.

Each of the second wall segments 130 includes an exterior surface 152 and an interior surface opposite the exterior surface 152. The interior surface faces toward the central axis 134 and the exterior surface 152 faces away from the central axis 134. The exterior surface 152 includes a second locking feature 154. In the illustrated embodiment, the second locking feature 154 includes an array of locking members configured as a plurality of ribs 156 and a series of grooves 158 that extend axially along the second wall segment 130. In other embodiments, a second locking feature of a cage can be configured as one or more other protrusions or recesses that extend fully or partially along a wall segment to engage a corresponding locking feature on another cage body to rotationally secure the two cage bodies, or as a differently configured feature configured to engage a corresponding detent (or other first locking feature).

As briefly described above, the cage body 122 also includes the openings 132 circumferentially spaced about the central axis 134 and formed in the circumferential wall 126. In general, each of the openings 132 is configured as a cutout in the circumferential wall 126 (e.g., a three-sided cutout, as shown), bounded by the first and second pairs of wall segments 128, 130 and the annular base 136. In the illustrated embodiment, each opening 132 has a substantially similar width (i.e., a circumferential arc length between the wall segments 128, 130). However, in other embodiments, a cage body may include openings within a circumferential wall having varied widths.

Referring now to FIGS. 4A-C, the first and second cage bodies 122 of the restriction cage 120 can be oriented in axially opposite configurations and then rotationally secured relative to one another at a plurality of alignments to provide any selected one of a plurality of profiles for an intermediate opening 162. For example, FIG. 4A illustrates the restriction cage 120 in a fully-open position. In the fully-open position, each opening 132 of the cage bodies 122 are fully radially aligned (i.e., are positioned for maximum overlap along common radial directions relative to a flow axis) so that neither of the first nor second pairs of wall segments 128, 130 overlap with any openings 132 of the cage bodies 122. Conversely, with the restriction cage 120 in a fully-closed position (not shown), both pairs of wall segments 128, 130 can overlap fully with the openings 132 to prevent flow through the restriction cage 120 via the openings 132. In use with a flow control device, for example, the fully-open position of the restriction cage 120 illustrated in FIG. 4A can correspond to a maximum capacity flowrate allowed through the intermediate openings 162 of the restriction cage 120.

In the illustrated embodiment, to reduce the flow rate through the restriction cage 120, one of the cage bodies 122 may be rotated relative to the other cage body 122. For example, the top restriction cage 122 illustrated in FIGS. 4A-C can be rotated in the direction indicated by the arrow to decrease the size of the profile at the intermediate opening 162. As shown in FIG. 4B, the restriction cage 120 is in a partially-open position. In use with a flow control device, the partially-open position illustrated in FIG. 4B can correspond to a reduced capacity flow rate allowed through the restriction cage 120 compared to the alignment of the restriction cage in FIG. 4A.

To further reduce the flow rate through the restriction cage 120, one of the cage bodies 122 may be rotated (e.g., the top cage body 122 in FIGS. 4A-C in the direction indicated by the arrow) to further decrease the size of the intermediate opening 162. As shown in FIG. 4C, the restriction cage 120 is in another partially-open position. In some embodiments, the partially-open position illustrated in FIG. 4C can correspond to a minimum rated capacity flow rate allowed through the restriction cage. For example, in the alignment of the cage bodies 122 illustrated in FIG. 4C, the first locking feature 144 may be engaged with the second locking feature 154 at an end groove of the series of grooves 158 so that the opening 162 formed by a partial alignment of the openings 132 of the first and second cage bodies 122 forms a smallest and most restrictive flow area through the restriction cage 120.

As generally described above, the intermediate opening 162 is thus configured as a variable flow opening that corresponds to an adjustable effective flow area through the restriction cage 120. In particular, for the illustrated example, as the opening 162 is increased or decreased, the cross-sectional area of the effective flow area varies linearly. For example, the area of the opening 162, which is formed by varied alignment of the openings 132 of the first and second cage bodies 122, is linearly proportional to the relative rotational alignment of the first and second cage bodies 122—at least over a range of possible degrees of rotation (e.g., between a fully-closed and fully-opened configuration). As a result, in use, the incremental adjustability of the opening 162 can provide precise, linearly adjustable flow control for a flow control device (e.g., regulator).

In general, the incremental adjustability of the restriction cage 120 can provide a high degree of flow control through a flow control device (e.g., a valve). In particular, the restriction cage 120 can be used to control flow within a valve based on a variety of external conditions. For example, a housing development (e.g., a neighborhood) may eventually require a relatively high gas flowrate. However, while a valve rated for a high flow rate may ultimately be suitable, in early stages of the development, gas demand may be low. In such instance, a restriction cage, such as the restriction cage 120, may be used to decrease flow openings of the valve so that the flow rate is controlled to an appropriate level for the required gas at an early stage of the development. In particular, a fixed cage can clamp down on the flow openings of the valve so that the valve can travel over more of its stable rage, as opposed to being a small distance (e.g., 1 millimeter) away from the seat in an unstable position. Additionally, in use, as demand increases, the restriction cage can be replaced or removed.

The variability of the restriction cage 120 can allow for flow rate adjustability based on a fluid flowrate demand or requirement. Additionally, the restriction cage 120 can help ensure that the flow control device in which the restriction cage 120 is installed is operated over a stable range for the expected fluid flowrate demand. As described above, a fluid flowrate demand can be dictated by the development of a neighborhood, among other factors, such as seasonal changes, for example.

Figure 5:
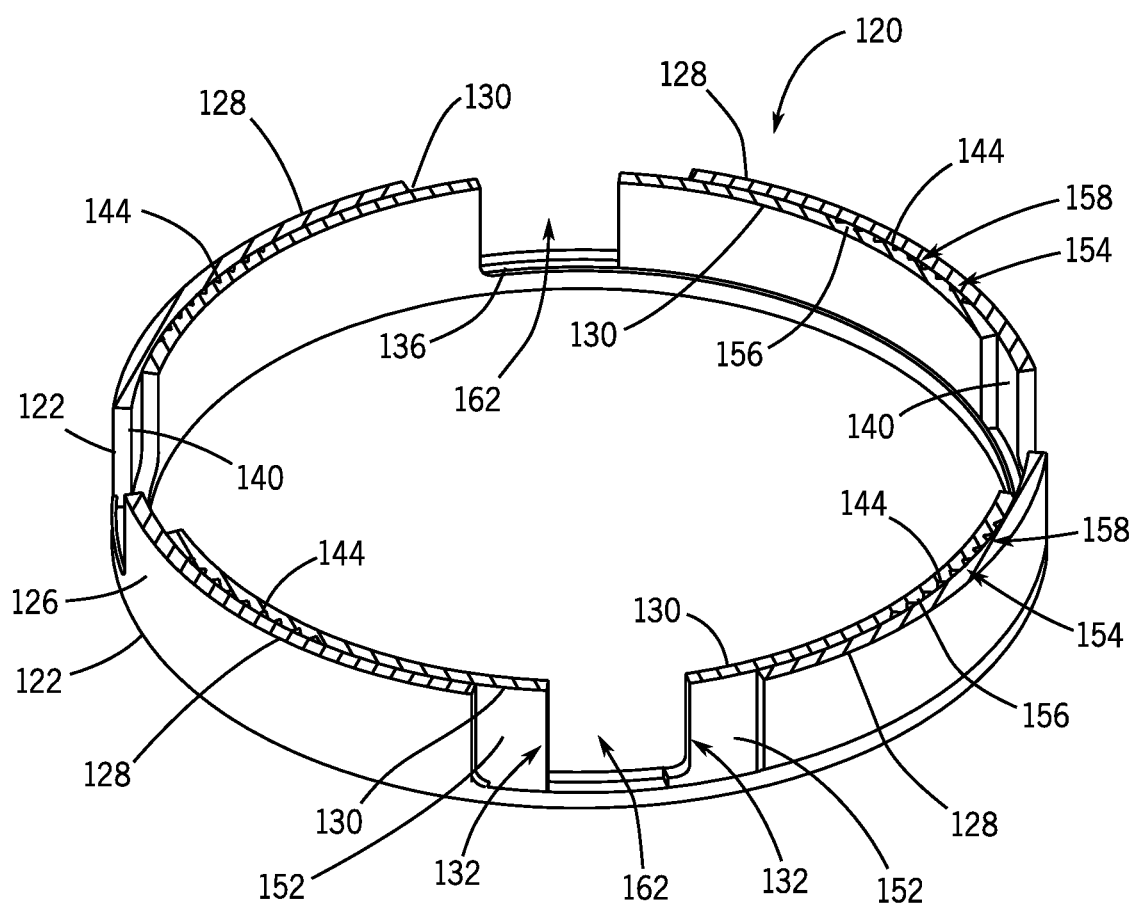
FIG. 5 is a cross-sectional isometric view of FIG. 4B taken along line 5-5.

With reference to FIG. 5, the first and second cage bodies 122 may be rotationally secured to one another when the first locking feature 144 is engaged with the second locking feature 154. For example, in the illustrated configuration, the first locking feature 144 is secured between two of the plurality of ribs 156 in one of the series of grooves 158. As illustrated in FIGS. 4A-C, and further exemplified in FIG. 5, rotating one of the first or second cage bodies 122 relative to the other cage body 122 can adjust the amount of overlap between their respective first and second circumferential walls 126. In the illustrated example, the number of grooves 158 correspond to the number of alignment positions between the first and second cage bodies 122, and therefore, the number of variable effective flow areas via the opening 162.

The use of ribs and grooves for locking features can be particularly beneficial in some cases, including by allowing easy and guided axial movement of cage bodies during assembly while correspondingly providing relatively robust resistance against rotational movement. However, a variety of other locking features can be used in other embodiments, to provide appropriate anti-rotational (or other) locking engagement.

Further illustrated in FIG. 5, when the first and second cage bodies 122 are rotationally secured to one another, the interior surfaces 140 of the first pair of wall segments 128 face and can abut the exterior surfaces 152 of the corresponding second pair of wall segments 130. In particular, because the wall segments 128 are radially offset from the wall segments 130, the wall segments 128, 130 of the first cage body 122 can interleave with the wall segments 130, 128 of the second cage body 122 and the cage bodies 122 can be moved axially into engagement with each other. Further, as also accommodated by the radial offset of the wall segments 128, 130, the ribs 144 can be lockingly engaged with an appropriate one of the grooves 158 as a direct consequence of the axial engagement. Thus, for example, an operator can determine an appropriate rotational alignment, then axially engage the cage bodies 122 together to both define and lock a size of the intermediate openings 162.

In some embodiments, an adjustable cage assembly may be configured as an infinitely adjustable restriction cage. For example, rather than having incremental alignment points between a first cage body and a second cage body (e.g., similar to the cage bodies 122), the cage bodies may be secured to one another at any degree of rotation along a continuous range (e.g., 360 degrees or more). In some embodiments, an infinitely adjustable restriction cage may include a locking mechanism to rotationally secure the first cage body relative to the second cage body. The locking mechanism, for example, can include a retention pin, a locking clip, a spring-biased retainer, or an interference fit, such as a press fit or friction connection, for example. In other embodiments, the first cage member can be fixed relative to the second cage member via a weld joint, for example, or by engagement with one or more other components within a flow control device.

The above description of the restriction cage 120 includes two matching cage bodies 122 having generally rectangular openings 132 formed in the respective circumferential walls 126. The rectangular openings 132 are generally symmetric about a vertical axis that extends parallel to the central axis 134, and therefore, form the rectangular variable opening 162. However, in other embodiments, an opening in a circumferential wall of a cage body of a restriction cage may include a variety of geometries which can form a corresponding variety of intermediate-opening profiles that form an effective flow area through the restriction cage.

FIGS. 6-8 illustrate example embodiments of opening profiles in a cage body that may be incorporated into a restriction cage, such as the restriction cage 120, for example. It will be appreciated that various geometries of opening profiles can be used in combination with the same (e.g., identical to within tolerances inherent to producing cage bodies to the same specifications) or different profiles formed in first and second cage bodies to form variable effective flow areas through the restriction cage. In particular, a restriction cage can include first and second cage bodies each having the same or different opening profiles formed in a corresponding circumferential wall.

Figure 6A:
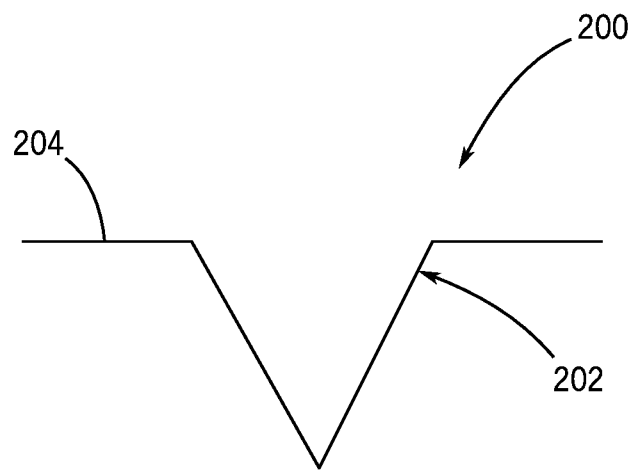
FIG. 6A is a schematic illustration of a cage body profile according to an embodiment of the invention.
Figure 6B:
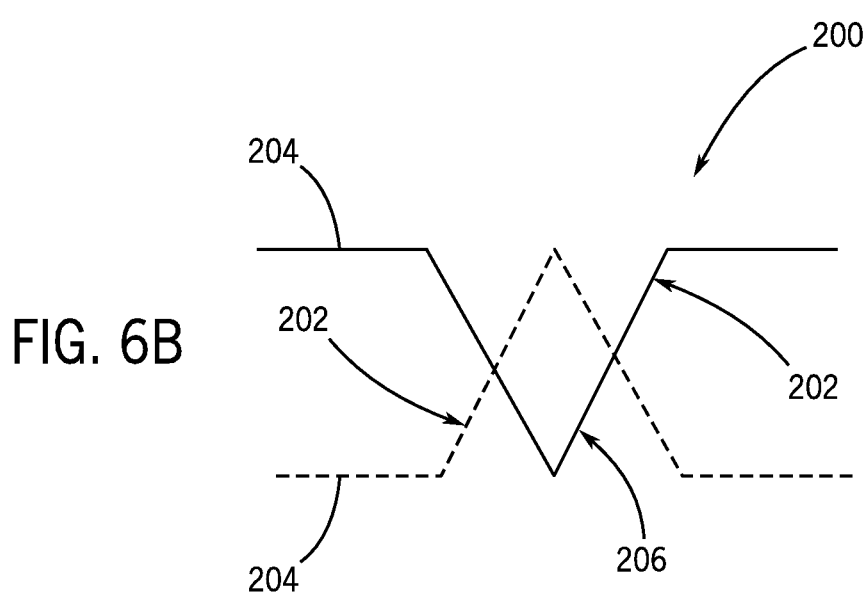
FIG. 6B is a schematic illustration of a flow opening formed by the cage body profile of FIG. 6A.
Figure 6C:
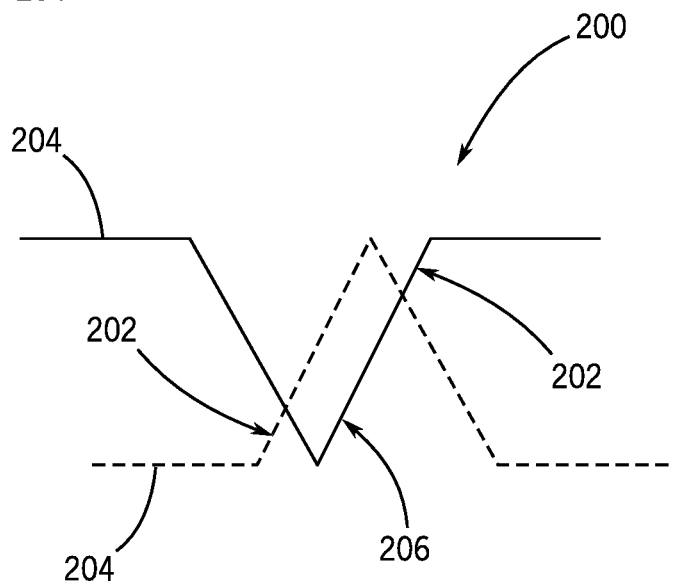
FIG. 6C is a schematic illustration of another flow opening formed by the cage body profile of FIG. 6A.

FIG. 6A illustrates a cage body profile 200 of an adjustable restriction cage according to one embodiment of the invention. The cage body profile 200 includes an opening 202 formed in a circumferential wall 204 of a cage body (two shown in FIGS. 6B and 6C, as installed, one in dashed lines). In the illustrated embodiment, the opening 202 is generally triangular and is symmetric about a vertical axis. FIGS. 6B and 6C illustrate varied alignments of the openings 202 of first and second cage body profiles 200 to form an intermediate opening 206. As with the intermediate opening 162, the intermediate opening 206 is thus a variable opening, the overall profile of which can be adjusted based on rotational alignment of first and second cage bodies.

Figure 7A:
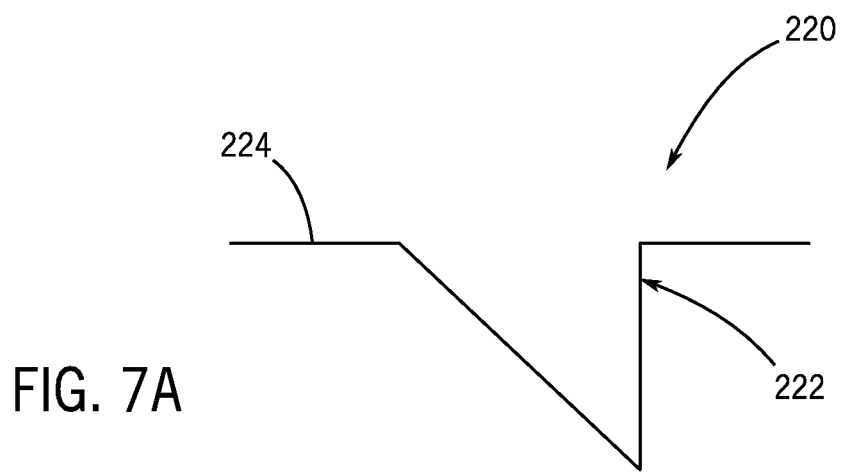
FIG. 7A is a schematic illustration of a cage body profile according to an embodiment of the invention.
Figure 7B:
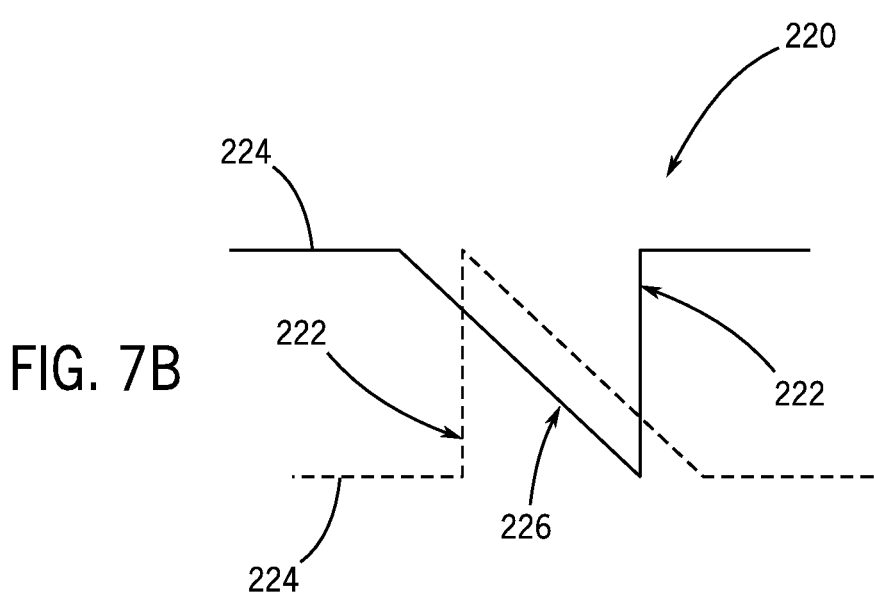
FIG. 7B is a schematic illustration of a flow opening formed by the cage body profile of FIG. 7A.
Figure 7C:
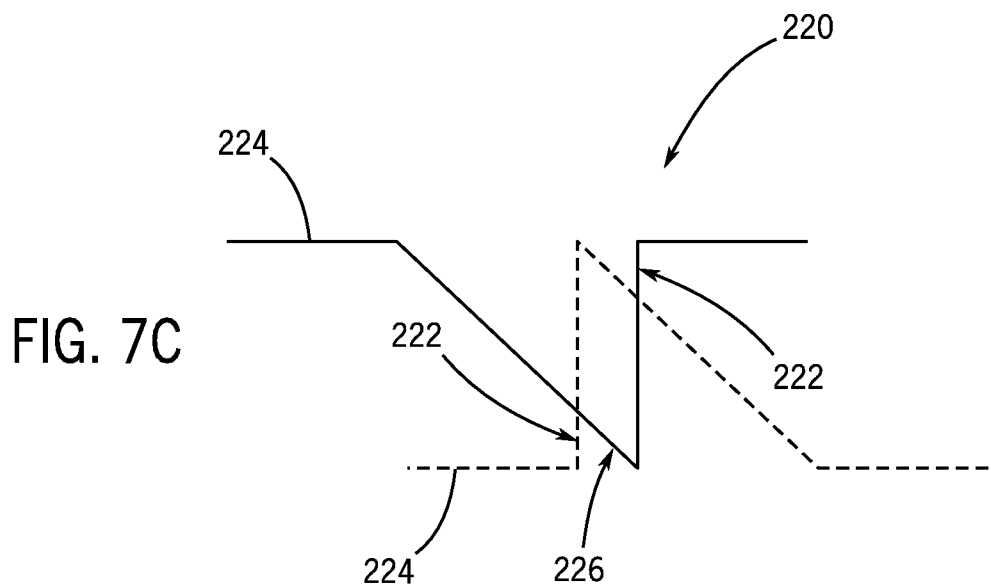
FIG. 7C is a schematic illustration of another flow opening formed by the cage body profile of FIG. 7A.

Similarly, FIG. 7A illustrates a cage body profile 220 of an adjustable restriction cage according to another embodiment of the invention. The cage body profile 220 includes an opening 222 formed in a circumferential wall 224 of a cage body (two shown in FIGS. 7B and 7C, as installed, one in dashed lines). In the illustrated embodiment, the opening 222 is generally triangular and is not symmetric about a vertical axis. FIGS. 7B and 7C illustrate varied alignments of the openings 222 of the first and second cage body profiles 220 to form an intermediate opening 226. Also like the intermediate opening 162, the intermediate opening 226 is thus a variable opening, the overall profile of which can be adjusted based on a rotational alignment of the first and second cage bodies.

Figure 8A:
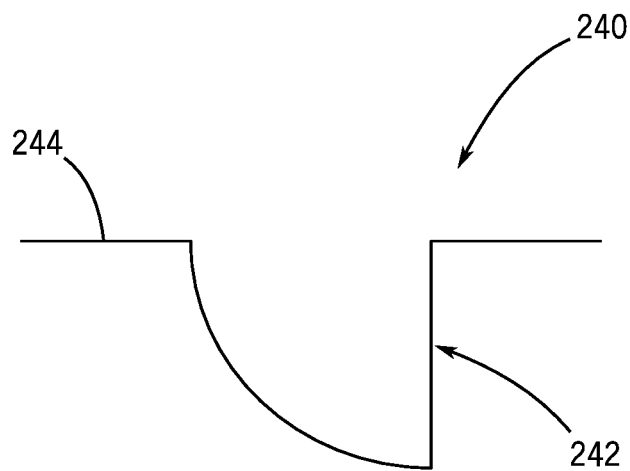
FIG. 8A is a schematic illustration of a cage body profile according to an embodiment of the invention.
Figure 8B:
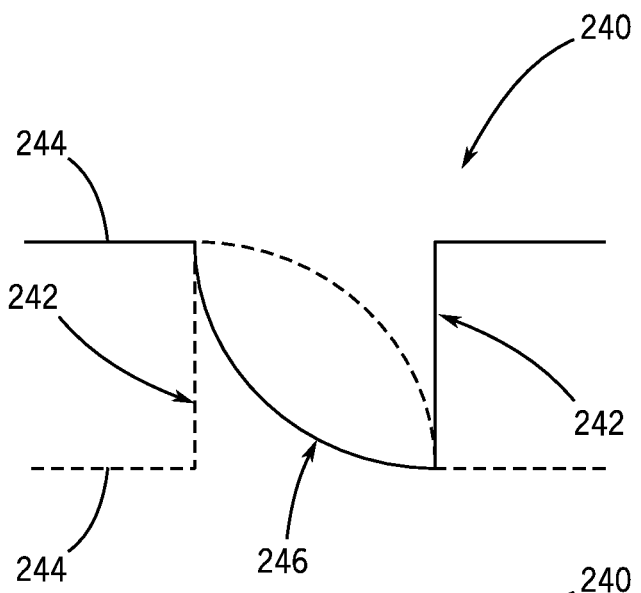
FIG. 8B is a schematic illustration of a flow opening formed by the cage body profile of FIG. 8A.
Figure 8C:
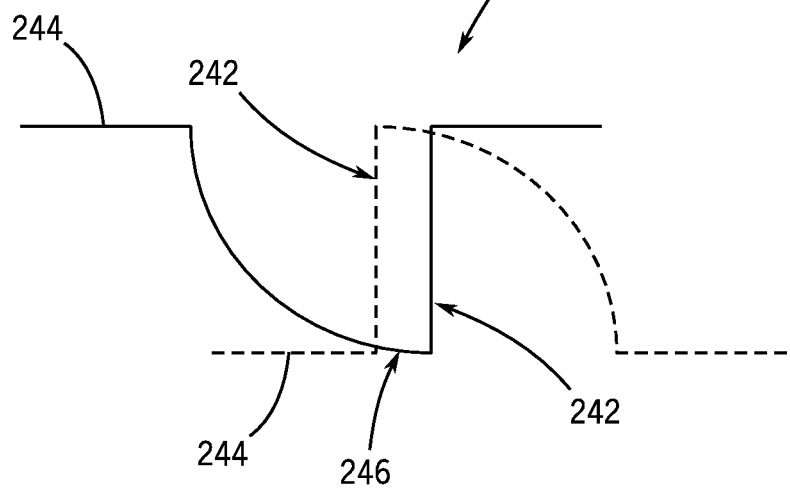
FIG. 8C is a schematic illustration of another flow opening formed by the cage body profile of FIG. 8A.

Further, FIG. 8A illustrates a cage body profile 240 of an adjustable restriction cage according to another embodiment of the invention. The cage body profile 240 includes an opening 242 formed in a circumferential wall 244 of a cage body (two shown in FIGS. 8B and 8C, as installed, one in dashed lines). In the illustrated embodiment, the opening 242 includes a non-polygonal geometry with a curved portion. FIGS. 8B and 8C illustrate varied alignments of the openings 242 of the first and second cage body profiles 240 to form an intermediate opening 246, which can be adjusted based on a rotational alignment of the first and second cage bodies.

Additionally, due to the curved geometry of the openings 242, the cage body profile 240 can provide unique and non-linear effective flow areas proportional to the rotational alignment of the first and second cage bodies (e.g., as shown by comparison of FIGS. 8B and 8C). In other embodiments, other profiles (e.g., other curved or polygonal profiles) can be configured to optimize relationships between rotational adjustment and changes in effective flow area for a particular installation.

Thus, embodiments of the disclosed invention can provide a system and method of adjusting an effective flow area in a flow control device. The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. An adjustable cage assembly for a flow control device, the adjustable cage assembly comprising:
a first cage body; and
a second cage body, each of the first and second cage bodies including:
a first wall segment having an interior surface and an exterior surface;
a first locking feature formed on the interior surface of the first wall segment;
a second wall segment having an interior surface and an exterior surface;
a second locking feature formed on the exterior surface of the second wall segment;
wherein the first wall segment and the second wall segment are spaced in a circumferential direction to form a first opening therebetween, and
wherein the first locking feature of the first cage body is configured to engage the second locking feature of the second cage body to rotationally secure the first cage body relative to the second cage body at one of a plurality of alignments to at least partially align the first opening of the first cage body with the first opening of the second cage body to form a corresponding plurality of opening profiles for flow across the first and second cage bodies.

2. The adjustable cage assembly of claim 1, wherein at least one of the first locking feature or the second locking feature includes an array of locking members.

3. The adjustable cage assembly of claim 2, wherein a locking member of the array of locking members is a rib that extends axially relative to the corresponding first or second cage body.

4. The adjustable cage assembly of claim 2, wherein the array of locking members includes a plurality of ribs and a plurality of grooves between the plurality of ribs, each one of the plurality of grooves or the plurality of ribs corresponding to one of the plurality of alignments.

5. The adjustable cage assembly of claim 1, wherein each of the first and second cage bodies include a continuous annular base, the first and second wall segments extending axially from the annular base.

6. The adjustable cage assembly of claim 5, wherein each of the first and second cage bodies include third and fourth wall segments extending axially from the annular base and opposite from the first and second wall segments, respectively.

7. The adjustable cage assembly of claim 1, wherein the interior surface of the first wall segment of the first cage body at least partially overlaps the exterior surface of the second wall segment of the second cage body at each of the plurality of alignments.

8. The adjustable cage assembly of claim 1, wherein each of the first and second cage bodies defines a respective central axis, and
wherein each first wall segment is radially farther from the respective central axis than each second wall segment.

9. The adjustable cage assembly of claim 1, wherein the opening profile corresponding to the first opening of the first cage body being fully radially aligned with the first opening of the second cage body provides a least-restrictive position for the adjustable cage assembly;
wherein the opening profile corresponding to the first wall segment of the first cage body extending circumferentially to the greatest extent across the first opening of the second cage body provides a most-restrictive position for the adjustable cage assembly; and
wherein additional opening profiles provide additional positions between the least-restrictive and most-restrictive positions.

10. The adjustable cage assembly of claim 1, wherein the first cage body and the second cage body are substantially identical to each other.

11. A restriction cage for a flow control device, the restriction cage comprising:
a first annular member; and
a second annular member that is substantially identical to the first annular member, the second annular member configured to be rotationally fixed relative to the first annular member at a plurality of alignments to provide a flow opening of a corresponding plurality of sizes, to provide adjustable control of fluid flow areas through the restriction cage.

12. The restriction cage of claim 11, wherein the first annular member includes a first circumferential wall and a first cutout formed in the first circumferential wall.

13. The restriction cage of claim 12, wherein the second annular member includes a second circumferential wall configured to axially overlap the first circumferential wall, and
wherein rotating the second annular member relative to the first annular member adjusts an amount of overlap between the first circumferential wall and the second circumferential wall.

14. The restriction cage of claim 12, wherein the second annular member includes a second circumferential wall and a second cutout formed in the second circumferential wall, and
wherein an alignment of the first cutout with the second cutout defines a current size of the flow opening.

15. The restriction cage of claim 11, wherein the first annular member includes an array of first locking members and the second annular member includes a second locking member, the second locking member configured to engage the array of first locking members to secure the first and second annular members at the plurality of alignments.

16. The restriction cage of claim 15, wherein a plurality of the first locking members are configured as one of a recess or a protrusion, and the second locking member is configured as the other of the recess or the protrusion.

17. A method of adjusting an effective flow area in a flow control device, the method comprising:
rotating a first cage body having a first opening relative to a second cage body having a second opening to align the first opening with the second opening at any selected one of a plurality of alignments to define an effective flow area, the first cage body being substantially similar to the second cage body;
rotationally securing the first cage body relative to the second cage body in the selected one of the plurality of alignments; and
installing the first cage body and the second cage body in the flow control device at a flow control opening.

18. The method of claim 17, wherein, from a reference orientation, rotating the first cage body relative to the second cage body in a first direction increases the effective flow area and rotating the first cage body relative to the second cage body in a second direction opposite the first direction decreases the effective flow area.

19. The method of claim 17, wherein, for a degree of rotation within a first rotational range, rotating the first cage body relative to the second cage body linearly increases or decreases the effective flow area relative to the degree of rotation.

* * * * *